US011329536B2

United States Patent
Khan et al.

(10) Patent No.: US 11,329,536 B2
(45) Date of Patent: *May 10, 2022

(54) ELECTRICAL MACHINE WINDING ASSEMBLY AND METHOD OF MANUFACTURE THEREOF

(71) Applicant: ROLLS-ROYCE plc, London (GB)

(72) Inventors: Jameel B. Khan, Manchester (GB); Alexis Lambourne, Belper (GB); Alexander C. Smith, Holmfirth (GB)

(73) Assignee: Rolls-Royce plc

( * ) Notice: Subject to any disclaimer, the term of this patent is extended or adjusted under 35 U.S.C. 154(b) by 169 days.

This patent is subject to a terminal disclaimer.

(21) Appl. No.: 16/558,652

(22) Filed: Sep. 3, 2019

(65) Prior Publication Data

US 2020/0119628 A1    Apr. 16, 2020

(30) Foreign Application Priority Data

Sep. 20, 2018 (GB) .................................... 1815304

(51) Int. Cl.
*H02K 15/04* (2006.01)
*H01B 3/12* (2006.01)
(Continued)

(52) U.S. Cl.
CPC ........... *H02K 15/0407* (2013.01); *H01B 3/12* (2013.01); *H02K 1/18* (2013.01); *H02K 3/02* (2013.01);
(Continued)

(58) Field of Classification Search
CPC ........ H02K 15/0407; H02K 1/18; H02K 3/02; H02K 3/30; H02K 3/34; H02K 3/50;
(Continued)

(56) References Cited

U.S. PATENT DOCUMENTS

2004/0196128 A1    10/2004   Du Val
2006/0022549 A1    2/2006    Otsuji
(Continued)

FOREIGN PATENT DOCUMENTS

CN    104242522       12/2014
DE    102014106851 A1  11/2015
(Continued)

OTHER PUBLICATIONS

Extended EP Search Report dated Dec. 19, 2019 and issued in connection with European Patent Application No. 19192444.8, 8 pages.
(Continued)

*Primary Examiner* — Tulsidas C Patel
*Assistant Examiner* — Riley Owen Stout
(74) *Attorney, Agent, or Firm* — Barnes & Thornburg LLP

(57) ABSTRACT

A method of manufacturing a winding assembly for an electrical machine, the method comprising: selecting (S1) a mathematical function defining the spatial separation between adjacent turns of a winding path, the mathematical function dependent on one or more parameters of the electrical machine and/or of the anticipated operating environment of the electrical machine; forming (S2), by three-dimensional, 3D, printing, an electrically insulating body comprising a channel defining the winding path in accordance with said function, the channel having an inlet and an outlet; heating (S3) the electrically insulating body to a temperature above the melting point of an electrically conducting material; flowing (S4) the electrically conducting material through the inlet to the outlet to fill the channel; and cooling the electrically insulating body to solidify the electrically conducting material within the channel, thereby forming said winding assembly.

12 Claims, 5 Drawing Sheets

(51) Int. Cl.
*H02K 1/18* (2006.01)
*H02K 3/02* (2006.01)
*H02K 3/30* (2006.01)
*H02K 3/34* (2006.01)
*H02K 3/50* (2006.01)
*H02K 15/12* (2006.01)
*B33Y 80/00* (2015.01)

(52) U.S. Cl.
CPC ............... *H02K 3/30* (2013.01); *H02K 3/34* (2013.01); *H02K 3/50* (2013.01); *H02K 15/12* (2013.01); *B33Y 80/00* (2014.12)

(58) Field of Classification Search
CPC ............ H02K 15/12; H02K 3/18; H02K 3/32; H02K 3/04; H02K 15/00; H02K 15/08; H01B 3/12; B33Y 80/00; H01F 5/02; H01F 41/125
See application file for complete search history.

(56) References Cited

U.S. PATENT DOCUMENTS

| | | | |
|---|---|---|---|
| 2012/0313477 A1 | 12/2012 | Haga et al. | |
| 2015/0333588 A1* | 11/2015 | Hinrich | H02K 3/30 310/215 |
| 2018/0205299 A1 | 7/2018 | Huang et al. | |

FOREIGN PATENT DOCUMENTS

| | | | | |
|---|---|---|---|---|
| DE | 3142229 A1 | * | 3/2017 | ............ H02K 3/22 |
| EP | 3113333 | | 1/2017 | |
| EP | 3142229 A1 | | 3/2017 | |
| JP | 2018117477 | | 7/2018 | |
| KR | 20160119424 | | 10/2016 | |
| WO | 2018147244 | | 8/2018 | |

OTHER PUBLICATIONS

Extended European Search Report, European Application No. 21155933.1-1201 dated Feb. 26, 2021, 10 pages. pages.
Great Britain search report dated Feb. 25, 2019, issued in GB Patent Application No. 1815302.3.
Great Britain search report dated Jun. 11, 2019, issued in GB Patent Application No. 1815304.9.
Great Britain search report dated Feb. 25, 2019, issued in GB Patent Application No. 1815304.9.
M. Sajid et al. "Impulse and Fast Surge Distribution of Voltage in 11 kV Industrial Motor" 2016 International Conference an Electrical, Electronics, and Optimization Techniques (ICEEOT), Chennai, 2016, pp. 215-219.

* cited by examiner

ELECTRICAL MACHINE WINDING ASSEMBLY AND METHOD OF MANUFACTURE THEREOF

CROSS-REFERENCE TO RELATED APPLICATIONS

This application is based upon and claims the benefit of priority from British Patent Application No. GB 1815304.9, filed on 20 Sep. 2018, the entire contents of which are herein incorporated by reference.

BACKGROUND

Technical Field

This disclosure relates to electrical machines and in particular to a winding assembly for an electrical machine and a method of manufacturing same.

Description of the Related Art

Conventional electrical machine design has certain temperature limitations. These limitations are typically set by the insulation system used on the windings/coils in the electrical machine, which may be a generator or a motor, for example. Electrical machine windings may be on the rotor, on the stator or on both, and typically comprise several turns of an electrically conducting wire, such as copper, wound around a soft magnetic tooth (pole). The electrically conducting wire is coated with an electrically insulating medium to prevent short circuits from occurring: within the winding (turn to turn insulation), between phases (phase to phase insulation) and between the winding and the tooth (phase to earth insulation).

In many electrical machines the insulation is provided by a polymer coating on the copper wire. Polymer-coated wire is rated according to the time that it is able to operate at a particular temperature, e.g. class H wire can operate for 20 000 hours at 180 degrees Celsius, whereas class M wire can operate for 20 000 hours at a higher temperature of 220 degrees Celsius. Class C, rated at up to 240 degrees Celsius, represents the best thermal capability in commonly available electric wires for electrical machines. At temperatures above 220 degrees Celsius there is an approximation that for every 10 degrees Celsius increase in temperature, the lifetime of the insulation is halved, i.e. at 230 degrees Celsius a class M wire will only last 10 000 hours. Thus for most high temperature motor/generator applications the temperature limit is 220 degrees Celsius and if the operating environment or self-heating of the machine creates a temperature greater than this the motor/generator should be actively or passively cooled to keep the wire temperature at or below 220 degrees Celsius.

For applications requiring an operating temperature above 220 degrees Celsius, ceramic insulated wires are available. Ceramic insulators have a better temperature capability than polymers. However they are not as flexible, they suffer from thermal expansion mismatch with the copper wire and they can crack with rapid heating (thermal shock). For one or more of these reasons, whilst ceramic insulated wires are in principle available, they are rarely chosen for use in electrical machine applications as the lifetime can be short due to failure modes such as crackling, thermal shock, etc.

In addition, the evolution of the power semiconductor has led to high switching frequencies of transistors employed in modern converter topologies used in conjunction with electric motors. Depending on the control characteristics (gate resistors, capacitors, voltage commands) and the pulse width modulation (PWM) scheme adopted, combined with the impedance of the cable leading to the electric motor and the winding itself, repetitive overvoltage on the motor terminals may result. The use of PWM may degrade the electrical insulation between turns of the motor windings and possibly reduce the motor lifetime. The impedance of the cables leading to the electric motor and the winding itself can be considered as a RLC (resistance, inductance and capacitance) circuit. When the values of the effective RLC circuit are such that the peak voltage exceeds the supply voltage, the circuit response to this excitation is defined as an overshoot. The overshoots affects the electrical insulation between adjacent turns of the winding and is dependent on several factors, such as the rise time of the voltage pulse applied to the motor according to the PWM scheme chosen, the length of cable leading from the voltage supply to the electrical machine, the minimum time separation between adjacent voltage pulses according to the PWM scheme chosen and the switching frequency.

The overshoot typically affects only, or substantially only, the first turn of the winding with respect to the point at which the voltage is applied to the electric motor winding. This is because the inductive and capacitive properties of the winding dampen the voltage pulse as it propagates through the winding from the input to the output—thereby decreasing its peak value. The faster the rise time of the applied voltage pulse (i.e. the greater the value of dV/dt) the more significant the overshoot effect is and therefore the greater the voltage difference which is observed between adjacent turns of the winding, e.g. between the first turn and the second turn of the winding. Thus faster rise times lead to a greater chance of electrical breakdown, known as partial discharge, occurring within the winding of the electrical machine.

Partial discharge is a small electrical spark (arc) that occurs within the insulation between turns of a winding. Each discrete partial discharge event is the result of an electrical breakdown of an air pocket within the insulation. Partial discharge will slowly erode a polymer insulation material. Over time, partial discharge can degrade the insulation to the extent that it will result in a full short circuit failure of the electrical machine. Partial discharge is particularly likely to be a problem in high frequency converter fed electrical machines where the voltage rise time for each energisation of a pole is very short (i.e. a large value of dV/dt). Around 40 percent of the input voltage is observed between the first two turns of the winding of an electric motor when the voltage pulse rise time is on the order of 200 nanosecond to 1 microsecond, a value typical of PWM inverters.

SUMMARY

According to a first aspect there is provided a method of manufacturing a winding assembly for an electrical machine, the method comprising:

selecting a function defining a spatial separation between adjacent turns of a winding path, the function dependent on one or more parameters of the electrical machine and/or of an anticipated operating environment of the electrical machine;

forming, by three-dimensional, 3D, printing, an electrically insulating body comprising a channel defining the winding path in accordance with the function, the channel having an inlet and an outlet;

heating the electrically insulating body to a temperature above the melting point of an electrically conducting material;

flowing the electrically conducting material through the inlet to the outlet to fill the channel; and cooling the electrically insulating body to solidify the electrically conducting material within the channel, thereby forming said winding assembly.

In the first aspect the winding assembly is manufactured by first 3D printing (also known in the art as additive manufacturing) the insulation such that a winding path is defined by a channel, and then subsequently introducing an electrically conducting material into the channel to form the winding. Advantageously, 3D printing can be carried out with a wide range of materials and the shape and location of the channel defining the winding path can be precisely controlled in the 3D printing process. Many electrically conducting materials are difficult to 3D print but this issue may be overcome by 3D printing the insulation first and then subsequently adding the electrically conducting material, as per the first aspect. By employing a 3D printing process to make the electrically insulating body, the shape or cross section of the channel can be made precisely as desired in order to accommodate an insulation gradient where partial discharge risk is mitigated by increased insulation thickness on initial turns of a coil. Further, the electrically insulating body can be shaped around the channels in order to improve heat transfer to the environment, e.g. by forming the body with fins or other projections to increase surface area for heat exchange. This helps to manage heat transfer from the coil to the environment and also manages power loss within the windings.

The step of forming the electrically insulating body may comprise firing the 3D printed body to densify the electrically insulating body prior to introduction of the electrically conductive material. The electrically insulating body may for example be formed from a refractory ceramic material such as alumina, which generally requires firing temperatures in excess of 1400 degrees Celsius, i.e. well above the melting temperature of electrically conductive materials such as copper.

The spatial separation between adjacent turns of the winding path is defined by a selected function which enables parameters such as dV/dt to be taken into account. 3D printing is well suited to creating structures in accordance with such functions. Selecting the spatial separation in accordance with a function also allows the packing factor of the winding assembly to remain within a reasonable tolerance, i.e. because not all turns of the winding require a greater separation, e.g. a graded separation may be defined by a function instead.

The one or more parameters may include one or more of:
a winding inductance;
a winding capacitance;
a winding resistance;
a dielectric strength of the material forming the electrically insulating body;
an anticipated operating temperature and/or pressure of the electrical machine;
a peak supply voltage to the electrical machine;
a rise time of the supply voltage to the electrical machine; and
a frequency of the supply voltage to the electrical machine.

The function may define a graded spatial separation between adjacent turns, such as the first two turns, of the winding path. The spatial separation may for example reduce from a maximum at an end of the winding path to a nominally constant separation at a predetermined distance along the winding path. As discussed above, the probability of partial discharge is likely to be greatest between the first two turns of the winding and may advantageously be substantially or completely eliminated by choosing a graded spatial separation between the first two turns of the winding path. The function may define a constant spatial separation between at least the last two turns of the winding path.

The function may define a larger average spatial separation between the first two turns of the winding path than between the second and subsequent two turns of the winding path. Partial discharge is more likely to occur between the earlier turns of the winding than between the latter turns of the winding, with respect to where the voltage is applied. In this manner the probability of partial discharge is reduced for the earlier turns of the winding whilst retaining a more compact separation of turns of the winding for the latter turns of the winding.

The function may be based on a model of partial discharge within the electrical machine. The spatial separation between adjacent turns of the winding path defined by the function may be calculated to minimize the probability of partial discharge occurring.

The channel may be formed internally to the electrically insulating body. The inlet and outlet may be formed at the surface of the electrically insulating body, such that the channel extends continuously through the electrically insulating body.

The electrically insulating body may be formed by 3D printing with a ceramic material. As set out above, ceramic material, when used as a winding electrical insulation, allows for higher temperature operation of the electrical machine since its melting point can be far greater than a conventional polymer coating. Furthermore, by 3D printing the ceramic material, many of the prior known issues with such coatings, e.g. lack of flexibility, can be overcome or ameliorated. The winding assembly formed by 3D printing with a ceramic material is particularly suitable for use at high temperatures and for high voltage electrical machines.

The electrically conducting material may be copper, silver or aluminium or an alloy thereof of any of these. The electrically insulating body may be heated to a temperature greater than 1100 degrees Celsius, preferably around 1300 degrees Celsius, prior to and during the step of flowing the electrically conducting material. Copper is an excellent electrical conductor and by heating the electrically insulating body to a temperature above the melting point of copper it is able to flow freely into the channel of the electrically insulating body defining the winding path thereby filling the channel without leaving voids.

The method may further comprise, prior to the step of flowing the electrically conducting material, vibrating the electrically insulating body and/or applying a high-pressure gas stream to the inlet to remove any debris from the channel via the outlet. This helps to ensure the winding path defined by the channel is clear to enable a smooth flowing of the electrically conducting material into the channel.

The method may further comprise applying a lower pressure to the outlet relative to the pressure at the inlet during the step of flowing the electrically conducting material. This aids the electrically conducting material to flow through the channel from the inlet to the outlet and may speed up the process. Further, if a pressurized inert gas is used then the copper is less likely to oxidise.

The channel may be substantially evacuated during the step of flowing the electrically conducting material. This helps to ensure the material fully fills the channel and does not oxidise or pick up other contaminants from the atmosphere within or around the winding assembly.

According to a second aspect there is provided a winding assembly for an electrical machine, the winding assembly comprising a monolithic electrically insulating body having a first channel defining a first winding path, the first channel being filled with an electrically conducting material, wherein the average spatial separation between the first two turns of the first winding path is larger than the average spatial separation between the last two turns of the first winding path Since the electrically insulating body is monolithic (i.e. a single, materially-continuous piece) it is strong and less prone to failure through thermal shock and the like. In addition, the average spatial separation between the first two turns of the winding path being larger means that the probability for partial discharge to occur between the first two turns is reduced.

The spatial separation between the first two turns of the first winding path may be graded. The spatial separation between the last two turns of the first winding path may be constant.

The first channel may be internal to the electrically insulating body, such that the first channel is contiguous on all sides with the electrically insulating body. An inlet and an outlet may be provided at the surface of the electrically insulating body.

The electrically insulating body may be formed of a ceramic material. The electrically conducting material may be copper. Ceramic is an excellent electrically insulator and copper is an excellent electrical conductor. Since ceramic has a higher melting point than conventional polymer insulation, an electrical machine employing a winding assembly according to the first aspect and with ceramic insulating material can operate in a high temperature environment without requiring cooling.

The winding assembly may further comprise a second channel defining a second winding path, the second channel being filled with an electrically conducting material, wherein the first and second channels are mutually DC electrically insulated by the electrically insulating body.

The first and second channels may together define a bifilar winding.

The winding assembly may further comprise a cavity for receiving a stator tooth.

According to a third aspect there is provided an electrical machine comprising a stator, a rotor and one or more winding assemblies according to the second aspect.

According to a fourth aspect there is provided an electric propulsor comprising a fan and an electric motor connected to a drive shaft and arranged to drive the fan, wherein the electric motor comprises a winding assembly according to the second aspect.

The electric propulsor may further comprise a gearbox connected to receive an input from the electric motor and to output drive to the fan so as to drive the fan at a lower rotational speed than the electric motor.

According to a fifth aspect there is provided an aircraft propulsion system comprising an electric propulsor according to the fourth aspect.

DESCRIPTION OF THE DRAWINGS

Embodiments will now be described by way of example only with reference to the accompanying drawings, which are purely schematic and not to scale, and in which.

DETAILED DESCRIPTION

Figure 1:
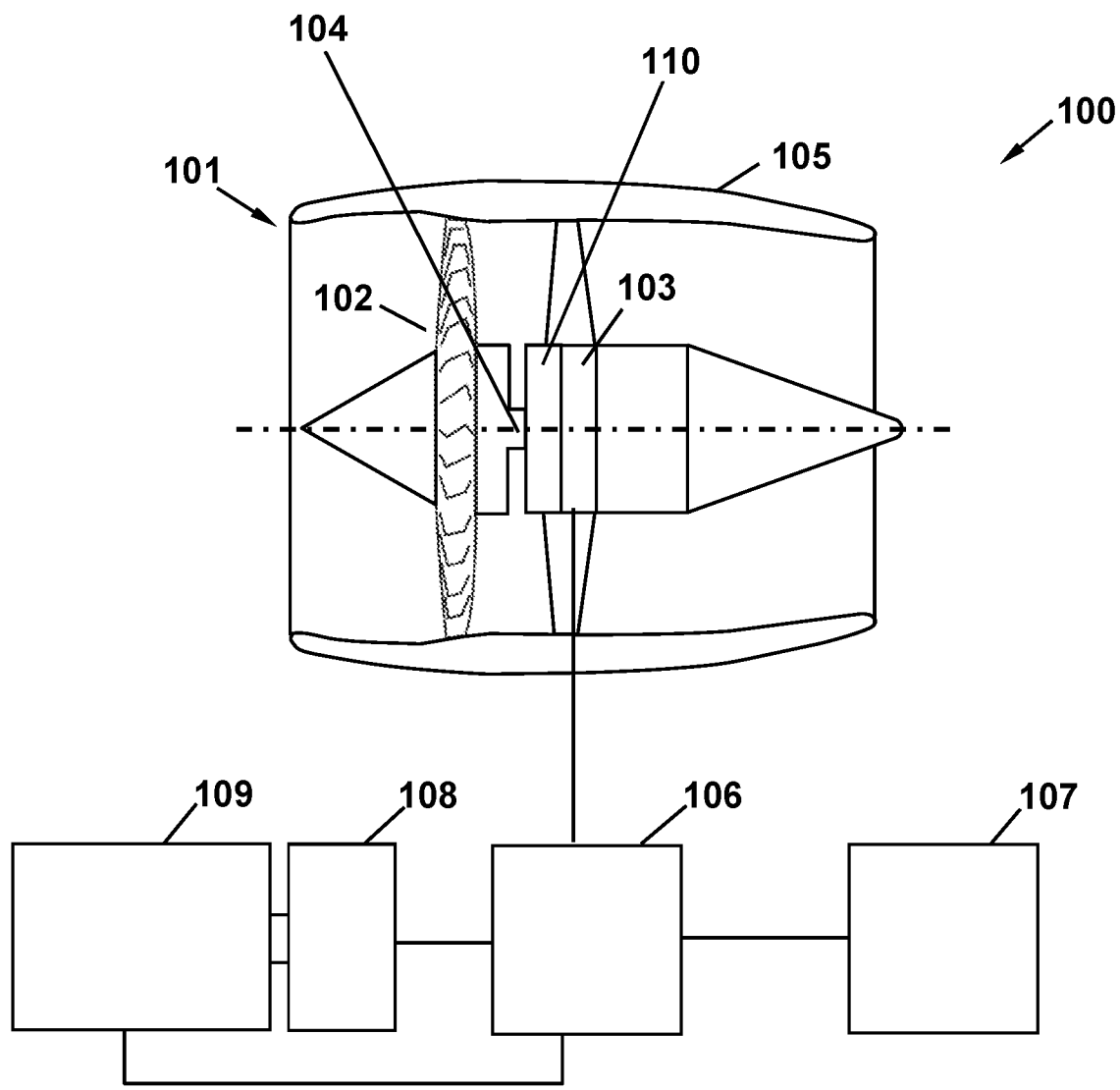
FIG. 1 is a sectional side view of an example hybrid electric aircraft propulsion system.

A schematic diagram of a basic hybrid electric aircraft propulsion system 100 is shown in FIG. 1. An electric propulsion unit, or engine, 101 comprises a fan 102 connected to an electric motor 103 by a central shaft 104. As with a conventional gas turbine engine, the engine 101 comprises a nacelle 105 surrounding the fan 102 and motor 103. The engine 103 is provided with electric power via power electronics in a controller 106, which is connected to an electric storage unit 107, which may include a battery, a supercapacitor or a combination of the two.

The controller 106 is also connected to a generator 108 and a gas turbine engine 109. The gas turbine engine 109 drives the generator 108 to generate electric power, which the controller 106 distributes between the electric storage unit 107 and the electric motor 103. Under some conditions, the electric motor 103 may also act as a generator, for example when a reduction in thrust is demanded and the forward movement of the engine 101 drives the fan 102 until a required fan speed is reached. Energy may then be taken from the motor 103 and stored in the electric storage unit 107.

The controller 106 takes inputs from the aircraft control system (not shown), which provides a thrust or fan speed demand. The controller 106 then manages how the demand is achieved, by balancing use of the gas turbine engine 109 and generator 108 with the electric storage unit 107. For example, when a step increase in demand is received, the controller 106 may use the electric storage unit 107 to provide an immediate increase in electric power to the motor 103, while the gas turbine engine 109 is powered up more slowly to accommodate for the different behaviour of the gas turbine 109. Once the gas turbine engine 109 has reached a required power output level, the balance of power taken from the generator 108 and electric storage unit 107 can shifted so that all of the electric power comes from the generator 108, and an additional amount can be used to recharge the electric storage unit 107.

The generator 108 and electric motor 103 of the hybrid electric aircraft propulsion system 100 are two examples of electrical machines. Electrical machines such as electric motor 103 and generator 108 generally contain of a plurality of coils/windings each formed of a number of electrically insulated turns of an electrically-conducting wire forming a winding assembly. The winding assembly may be provided on the stator, rotor or both.

Figure 2:
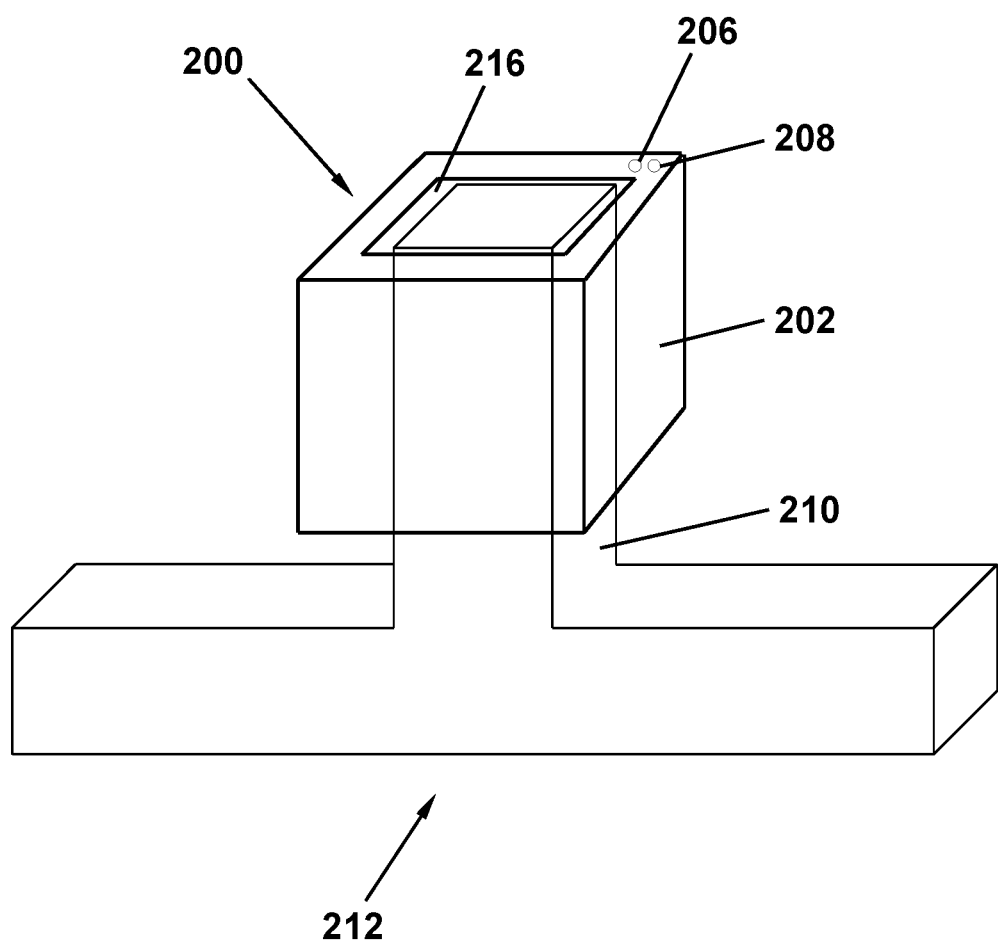
FIG. 2 illustrates a winding assembly mounted on a tooth.

FIG. 2 illustrates an electrical machine winding assembly 200 according to the present disclosure. The winding assembly 200 is shown in situ on a magnetic tooth 210 of a rotor or stator 212 forming part of an electrical machine such as an electric motor or generator described above with reference to FIG. 1. The winding assembly consists of an electrically insulating body 202 formed of e.g. ceramic or another electrically insulating material. The winding assembly 200 also has a central cavity 216 which is shaped to receive the tooth of a stator 212 or rotor on which the winding assembly is to be located.

The electrically insulating body 202 is formed by 3D printing the ceramic material. In this manner, the electrically insulating body 202 can be formed with a channel 204 defining a winding path, shown in FIGS. 3 and 4. The channel 204 is preferably internal to the insulating body 202 such that it is contiguous on all available sides with the electrically insulating body 202. The channel 204 has an inlet (or runner) 206 and an outlet (or riser) 208 at the surface of the electrically insulating body 202. Since the electrically insulating body 202 is 3D printed, it is effectively a single, materially continuous, i.e. monolithic, piece. This makes it strong and less prone to failure through thermal shock and the like.

Figure 3:
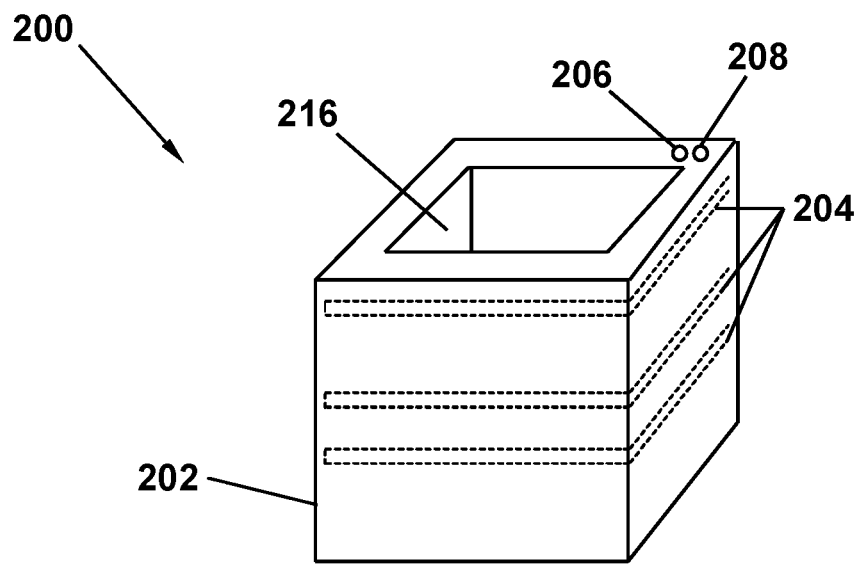
FIG. 3 illustrates channels of an electrically insulating body of a winding assembly prior to filling with an electrically conducting material.
Figure 4:
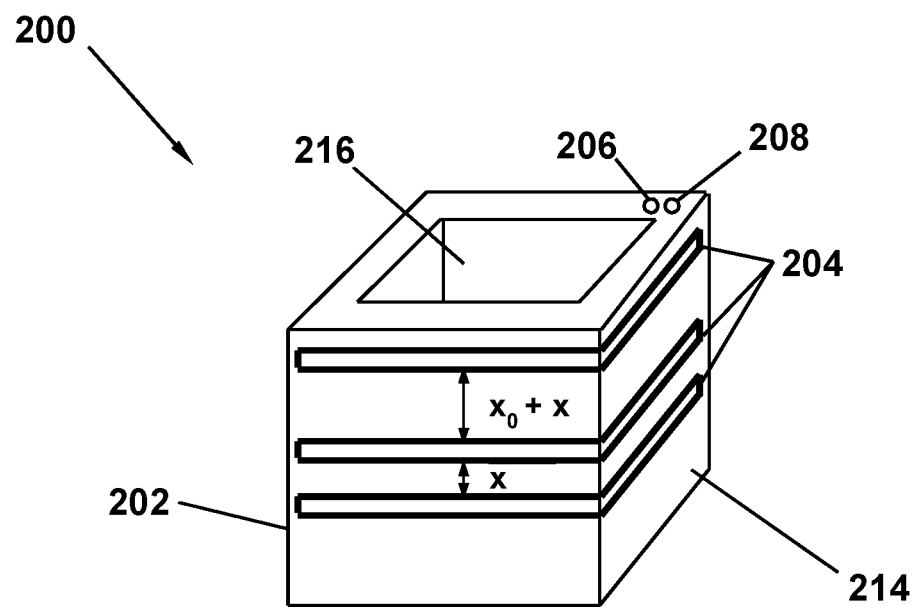
FIG. 4 illustrates channels of an electrically insulating body of a winding assembly after filling with an electrically conducting material.

In FIG. 3 the channel 204 is hollow whereas in FIG. 4 the channel 204 is shown filled with an electrically conducting material 214, such as copper. The channel 204 is filled with the electrically conducting material 214 by first heating the electrically insulating body 202 to a temperature above the melting point of the electrically conducting material 214. For example, if copper is used as the electrically conducting material 214 then the electrically insulating body 202 is heated to a temperature in excess of 1000 degrees Celsius, preferably 1300 degrees Celsius. Then, once the electrically insulating body 202 and the channel 204 within it have reached a temperature above the melting point of the electrically conducting material 214, molten electrically conducting material 214 is flowed into the channel 204 via the inlet 206 to fill the channel 204 through to the outlet 208. Once the channel is full with electrically conducting material 214 the winding assembly 200 is cooled down in order to solidify the electrically conducting material 214 within the channel 204 to thereby form the winding. The inlet 206 and outlet 208 then serve as electrical terminals for the winding in order to connect it to adjacent windings or to a power supply, for example.

In the winding assembly 200 of FIGS. 3 and 4, the separation between the first two turns of the channel 204 defining the winding is $x_0+x$ whereas the separation between the final two turns of the channel 204 defining the winding is $x_0$, i.e. less than the separation between the first two turns of the channel 204 defining the winding path. In a practical implementation, the number of turns of the winding will be greater than that shown. In a general aspect, the spacing between the first and second turns of the winding is greater than between the second and subsequent turns of the winding. The spacing may be graded along the length of the winding.

In the case that the electrical machine is an electrical motor, the input voltage is applied at the first turn. In this manner, the first turns of the winding may experience an overshoot as described above and thus the electrically insulating body 202 of the winding assembly 200 is more prone to the phenomenon of partial discharge within the region between the first two turns of the winding defined by the channel 204. In other words, when input voltage is applied at the input 206 rather than at the output 208, the potential difference between the first two turns of the winding will be larger than the potential difference between the last two turns of the winding when an input voltage pulse is applied, due to the overshoot phenomenon described above, i.e. because the pulse becomes temporally more spread out as it propagates through the winding from the first turn to the last turn.

The spatial separation between adjacent turns of the winding path defined by the channel may follow a function which is dependent on one or more parameters of the electrical machine and/or of the anticipated operating environment of the electrical machine, such as, but not necessarily limited to: the winding inductance; the winding capacitance; the winding resistance; the dielectric strength of the material forming the electrically insulating body 202; the anticipated operating temperature and/or pressure of the electrical machine employing the winding assembly 200; the peak supply voltage to the electrical machine employing the winding assembly 200; the rise time of the supply voltage to the electrical machine employing the winding assembly 200 (i.e. dV/dt); and/or the frequency of the supply voltage to the electrical machine.

The function may specify a constant additional separation between the first turns of the winding, or may be more complex in nature, e.g. specifying a graded separation which tapers from a larger separation at the input to a constant separation after a set number of turns, for example after one turn, of the winding. The constant separation may be the same as the separation between the final two turns of the winding. In general, the function defines a winding path such that the average spatial separation between the first two turns of the winding is greater than the average spatial separation between subsequent turns of the winding—to mitigate the effect of overshoot described above. For example, if the first two turns have a graded separation going from $x_0+x$ to x over the length of one complete turn of the winding and the final two turns have a constant separation of x then the average separation between the first two turns will be $0.5 \cdot x_0+x$ and the average separation between the final two turns will be x.

Figure 5:
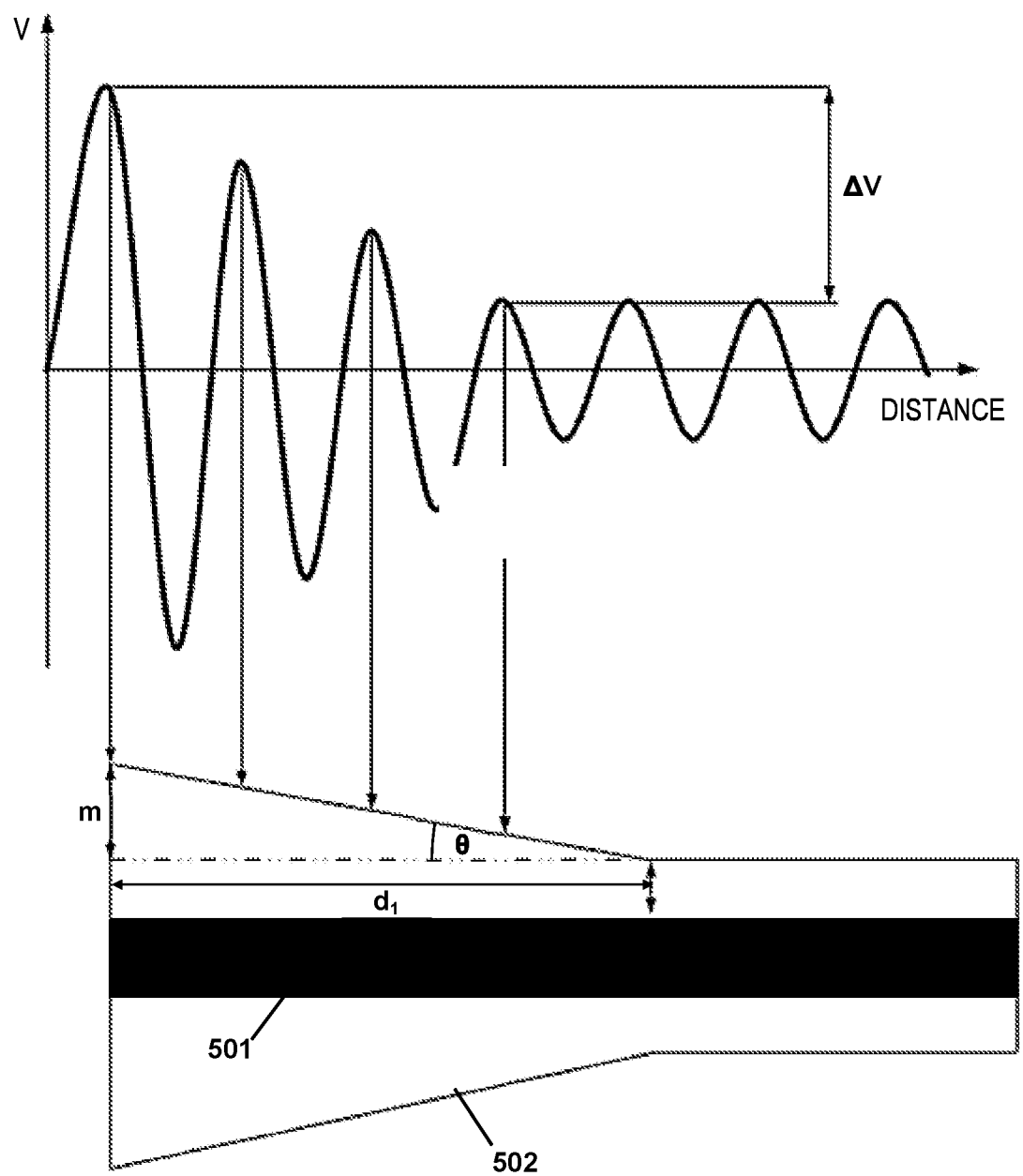
FIG. 5 illustrates a graded spatial separation between turns of a winding assembly.

Referring to FIG. 5, an example schematic plot of a voltage amplitude signal as a function of distance along a coil is shown in a top portion of FIG. 5, and a corresponding schematic illustration of a conductor 501 surrounded by an insulating layer 502 of variable thickness is shown in a bottom portion of FIG. 5. A maximum increase in insulation thickness, m, is determined based on the maximum overshoot voltage, $\Delta V$, The distance, $d_1$, over which the insulation thickness reduces to a nominal thickness, n, is determined by the inductance, capacitance and insulation thickness of the coil, as well as the overshoot voltage and the temperature envelope. An angle of graduation, $\theta$, may be defined as the decay of the overshoot voltage to a steady state. Various mathematical equations can be derived to calculate the voltage stress each turn of the coil will see, based on the specific coil parameters and the voltage waveform data. Examples of such equations and calculations are disclosed by M. Sajid et al, in "Impulse and fast surge distribution of voltage in 11 kV industrial motor," 2016 *International Conference on Electrical, Electronics, and Optimization Techniques (ICEEOT)*, Chennai, 2016, pp. 215-219 doi: 10.1109/ICEEOT.2016.7755049.

In the simple example shown in FIG. 5, the reduction in insulation thickness is approximated by a linear function, such that the insulation thickness, t, at a distance d along the conductor length, is defined as:

$$t = \begin{cases} n + m\frac{(d_1 - d)}{d_1}, & d \le d_1, \\ t = n, & d > d_1 \end{cases} \quad \text{[Equation 1]}$$

The above function therefore provides in general terms a graded spatial separation between adjacent turns of the winding path of a coil, such that the spatial separation reduces from a maximum at an end of the winding path to a nominally constant separation at a predetermined distance along the winding path. In the example shown, the graded spatial separation is a linear reduction in separation between adjacent turns. In other examples the graded spatial separation may be non-linear. Other functions may for example be defined, such as an exponentially decaying function, to more closely approximate the reduction in voltage stress along the conductor length. In general terms, the average spatial separation between the first and second turns of the winding path will be greater than between the second and subsequent turns.

Before the molten electrically conducting material 214 is flowed into the channel 204 it may be advantageous to vibrate the electrically insulating body 202 and/or apply a high-pressure gas flow from the inlet 206 to the output 208 in order to remove any debris from the channel 204. Such debris may be, for example, loose ceramic dust or fragments within the channel 204 left over from the 3D printing process used to form the electrically insulating body 202 or any other foreign bodies which may otherwise prevent a smooth flowing of the electrically conducting material 214 into the channel 204.

In order to assist the flowing of the molten electrically conducting material 214 into the channel 204, the pressure at the outlet 208 may be held lower than the pressure at the inlet 206 in order to effectively draw the molten electrically insulting material 214 through the channel 204 from the inlet 206 to the outlet 208. Alternatively the flowing in of the electrically conducting material 214 may be done in vacuum or near vacuum conditions in order to prevent oxidation or contamination of the electrically conducting material from contaminants in the atmosphere.

The winding assembly 200 with the channel 204 filled with copper may operate at temperatures up to approximately 1000 degrees Celsius without being subject to deleterious phenomena such as partial discharge. Winding assemblies according to the present disclosure do not necessarily require a cooling system because of their higher maximum operating temperature compared to conventional windings based on polymer insulation. This opens up the option of using alternative machine topologies (non-permanent magnet) such as induction, switched reluctance, and synchronous electrical machines. These have added advantages including: simpler operation, no/reduced complexity converter and eliminated cooling system. This results in less weight and a more power dense electrical system.

Whilst the winding assembly 200 described with reference to FIGS. 2 to 4 is shown with one winding channel 204, the winding assembly could be formed with multiple winding channels which are direct-current (DC) electrically isolated from one another and are therefore electrically separate windings of the electrical machine in which the winding assembly is employed. In this manner, the 3D printing process can be used to carefully control the geometry and interplay of the different windings. For example, a bifilar winding could be created from two separate channels inside the electrically insulating body of the winding assembly. Whilst the electrically insulating body provides DC electrical isolation between the two or more windings it will still allow for inductive coupling between windings.

An electric motor 103 comprising winding assemblies 200 of the type described herein is particularly suitable for high speed, high power output applications, for example in aerospace applications where power to weight ratio is an important factor. Such an electric motor 103 may therefore be suitable for use in electric propulsion applications such as an electric propulsor 101 of the type illustrated in FIG. 1. The propulsor 101 may further comprise a gearbox 110 connected to receive an input from the electric motor 103 and to output drive to the fan 102 via shaft 104 so as to drive the fan 102 at a lower rotational speed than the electric motor 103. The use of a gearbox 110 allows the electric motor to be driven at higher speeds, thereby allowing the use of a smaller motor for the same power output. Winding assemblies 200 according to the present disclosure may also find application in other machines having operating in a high temperature/voltage environment, such as hybrid trains, electric turbocharging for diesel engines and hybrid drives for yachts.

Figure 6:
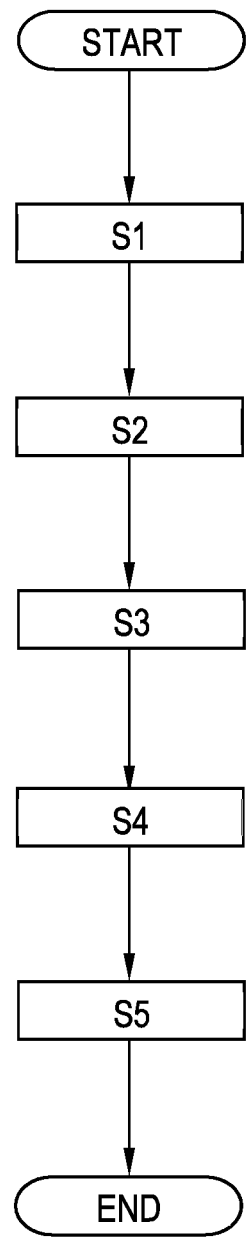
FIG. 6 is a flowchart corresponding to a method of manufacturing a winding assembly.

FIG. 6 is a flow chart corresponding to a method of manufacturing a winding assembly for an electrical machine, the method comprising:

S1: selecting a function defining the spatial separation between adjacent turns of a winding path, the function dependent on one or more parameters of the electrical machine and/or of the anticipated operating environment of the electrical machine;

S2: forming, by three-dimensional, 3D, printing, an electrically insulating body comprising a channel defining a winding path in accordance with said function, the channel having an inlet and an outlet;

S3: heating the electrically insulating body to a temperature above the melting point of an electrically conducting material;

S4: flowing the electrically conducting material through the inlet to the outlet to fill the channel; and S5: cooling the electrically insulating body to solidify the electrically conducting material within the channel, thereby forming said winding assembly.

Step S2 may further comprise firing to densify the 3D printed electrically insulating body, for example if the 3D printed body is formed from a ceramic powder with a binder. As with conventional ceramic processing, the binder may be removed by pyrolysis at temperatures up to around 400 to 500 degrees Celsius, followed by high temperature firing, typically at temperatures of over 1200 degrees Celsius, of the remaining ceramic material, the firing temperature dependent on the type of ceramic material.

Whilst the winding assembly 200 described with reference to FIGS. 2 to 4 has a generally regular shape, the skilled person would appreciate that the shape is not limited as such and instead it may assume any shape as desired and which may be produced by a 3D printing process.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A method comprising manufacturing a winding assembly for an electrical machine, the method comprising:
    selecting a function defining a spatial separation between adjacent turns of a winding path, the function dependent on one or more parameters of the electrical machine and/or an anticipated operating environment of the electrical machine;

forming, by three-dimensional, 3D, printing, an electrically insulating body comprising a channel defining the winding path following the function, the channel having an inlet and an outlet;

heating the electrically insulating body to a temperature above the melting point of an electrically conducting material;

flowing the electrically conducting material through the inlet to the outlet to fill the channel; and cooling the electrically insulating body to solidify the electrically conducting material within the channel, thereby forming said winding assembly, wherein the one or more parameters include one or more of:

a winding inductance;

a winding capacitance;

a winding resistance;

a dielectric strength of the material forming the electrically insulating body;

an anticipated operating temperature and/or pressure of the electrical machine;

a peak supply voltage to the electrical machine;

a rise time of the supply voltage to the electrical machine; and a frequency of the supply voltage to the electrical machine.

2. A method comprising manufacturing a winding assembly for an electrical machine, the method comprising:

selecting a function defining a spatial separation between adjacent turns of a winding path, the function dependent on one or more parameters of the electrical machine and/or an anticipated operating environment of the electrical machine;

forming, by three-dimensional, 3D, printing, an electrically insulating body comprising a channel defining the winding path following the function, the channel having an inlet and an outlet;

heating the electrically insulating body to a temperature above the melting point of an electrically conducting material;

flowing the electrically conducting material through the inlet to the outlet to fill the channel; and cooling the electrically insulating body to solidify the electrically conducting material within the channel, thereby forming said winding assembly, wherein the function defines a graded spatial separation between adjacent turns of the winding path.

3. The method of claim 2, wherein the spatial separation reduces from a maximum at an end of the winding path to a nominally constant separation at a predetermined distance along the winding path.

4. The method according to claim 1, wherein the function defines a larger average spatial separation between first and second turns of the winding path than between the second and subsequent turns of the winding path.

5. The method according to claim 1, wherein the function is based on a model of partial discharge within the electrical machine and the spatial separation between adjacent turns of the winding path defined by the function is calculated to minimize the probability of partial discharge occurring.

6. The method according to claim 1, wherein the channel is formed internally to the electrically insulating body and the inlet and outlet are formed at the surface of the electrically insulating body, such that the channel extends continuously through the electrically insulating body.

7. The method according to claim 1, wherein the electrically insulating body is formed by 3D printing with a ceramic material.

8. The method according to claim 1, wherein the electrically conducting material is copper and the electrically insulating body is heated to a temperature greater than 1100 degrees Celsius, preferably around 1300 degrees Celsius, prior to and during the step of flowing the electrically conducting material.

9. The method according to claim 1, further comprising prior to the step of flowing the electrically conducting material, vibrating the electrically insulating body and/or applying a gas stream to the inlet to remove any debris from the channel via the outlet.

10. The method according to claim 1, further comprising applying a lower pressure to the outlet relative to a pressure at the inlet during the step of flowing the electrically conducting material.

11. The method according to claim 1, wherein the channel is substantially evacuated during the step of flowing the electrically conducting material.

12. The method according to claim 1, wherein the function defines a graded spatial separation between adjacent turns of the winding path.

* * * * *